Figures 1, 2:
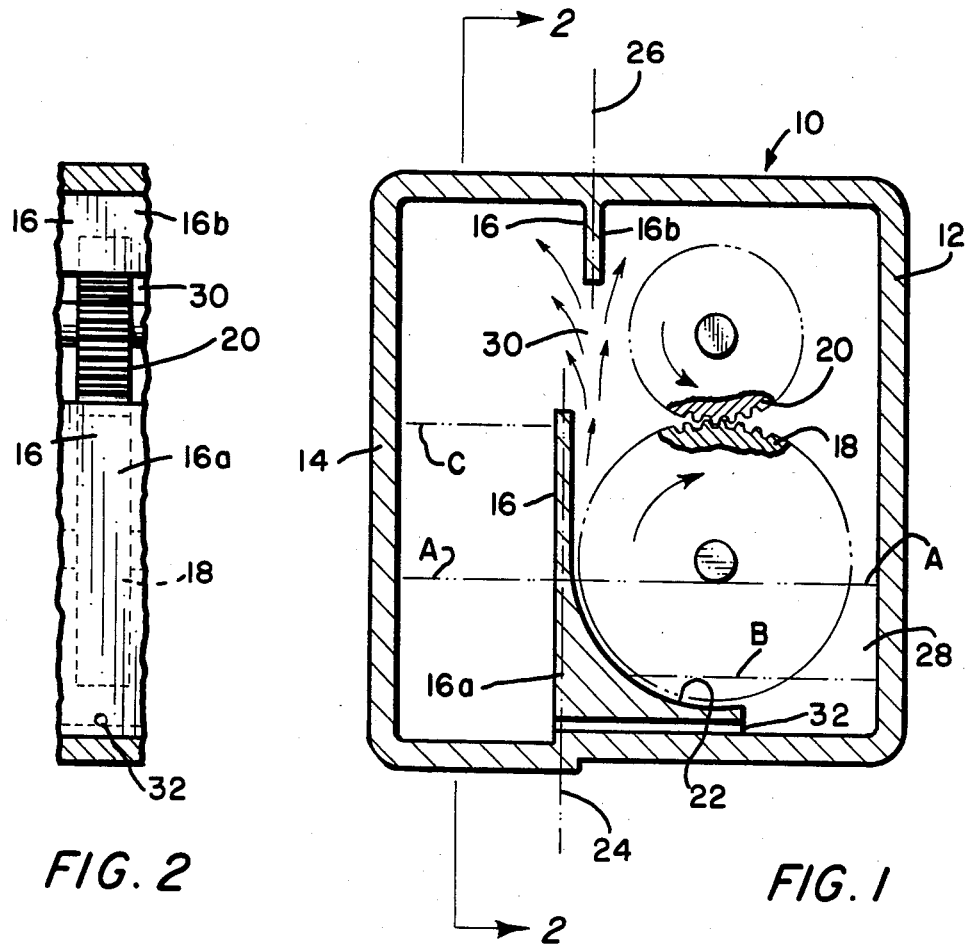

United States Patent [19]

Sowards

[11] Patent Number: 4,721,184
[45] Date of Patent: Jan. 26, 1988

[54] OIL CONTROL SYSTEM

[75] Inventor: Brian D. Sowards, Mocksville, N.C.

[73] Assignee: Ingersoll-Rand Company, Woodcliff Lake, N.J.

[21] Appl. No.: 8,026

[22] Filed: Jan. 28, 1987

[51] Int. Cl.⁴ .......................... F01M 9/06; F01M 9/10
[52] U.S. Cl. .................................... 184/6.12; 184/11.1
[58] Field of Search .................... 184/6.12, 11.1, 11.2, 184/13.1, 11.3; 74/467, 468

[56] References Cited

U.S. PATENT DOCUMENTS

| | | | |
|---|---|---|---|
| 1,220,810 | 3/1917 | Alquist | 184/6.12 |
| 1,554,081 | 9/1925 | Garrett | 184/11.1 |
| 3,529,698 | 9/1970 | Nelson | 184/11.2 |
| 3,601,515 | 8/1971 | Pelizzoni | 184/6.12 |
| 3,618,711 | 11/1971 | Vollmer | 184/11.2 |
| 3,625,310 | 12/1971 | Herrick | 184/13.1 |
| 4,630,711 | 12/1986 | Levrai | 184/11.2 |

FOREIGN PATENT DOCUMENTS 1801917  5/1970  Fed. Rep. of Germany ..... 184/6.12

Primary Examiner—Carlton R. Croyle
Assistant Examiner—Jane E. Obee
Attorney, Agent, or Firm—B. J. Murphy

[57] ABSTRACT

In the disclosed embodiment, the system has a gear housing and an oil reservoir in juxtaposition, with a separated wall therebetween, and a metering channel in penetration of the wall. A gear in the housing throws oil from the lower portion of the housing (i.e., the sump) upwardly to lubricate a meshing gear, bearings, and seals, etc., and to discharge some of the oil through the wall separation into the reservoir. As a consequence of the latter, the oil level in the sump is transformed from a high static level to a lowered, dynamic level in which only the teeth of the oil-throwing gear contact the oil. The metering channel insures that the housing will have some oil constantly supplied thereto from the reservoir, while the latter gear is throwing oil, and that the static level will subsequently return when the gear is halted.

3 Claims, 2 Drawing Figures

U.S. Patent

Jan. 26, 1988

4,721,184

OIL CONTROL SYSTEM

This invention pertains to oil control systems, and in particular to an oil control system which transforms an oil level in a sump from a maxmum, high, static level to a minimum, lowered, dynamic level, while providing for necessary and adequate lubrication of components.

It is an object of this invention to set forth an oil control system comprising a housing for confining, therewithin, a pair of meshing gears; an oil reservoir; separate, first and second means for effecting fluid communication between said housing and said reservoir; and means confined within said housing for impelling oil from said housing to said reservoir via one of said first and second means.

Further object of this invention, as well as the novel features thereof will become more apparent by reference to the following description taken in conjunction with the accompanying figures, in which:

FIG. 1 is an elevational view showing meshing gears (only symbolically) in a gear housing, and a juxtapositioned oil reservoir, with a separated wall therebetween, the housing, reservoir and wall being cross-sectioned; and FIG. 2 is a partial cross-section taken along section 2—2 of FIG. 1.

As shown in the figures, a structure 10 comprises a gear housing 12 and an oil reservoir 14 in juxtaposition with a common, separated wall 16 therebetween. A pair of gears 18 and 20, shown only symbolically, are confined within the housing 12 and are in mesh. The arrows denote the rotary orientation of the gears 18 and 20.

The lower portion 16a of wall 16 has an arcuate surface 22 which defines a close clearance (e.g., 0.100-inch) with the outermost toothed surface of the gear 18. The portion 16a has a principal, planar riser which subsists in a given plane 24, and the upper portion 16b subsists in a different, albeit parallel plane 26. Gear 18 throws oil from the sump 28 of housing 12 upwardly, along surface 22, to lubricate gear 20 (and bearings and seals not shown) and to discharge oil, through the separation 30 in wall 16, into the reservoir 14.

When the gears 18 and 20 are at halt, the static, maximum oil level in the sump 28, and in the reservoir 14, as is shown at "A" by the broken line. When the gears 18 and 20 are running, the sump 28 is depleted of oil until it reaches a level as shown, at "B" and the level in the reservoir 14, consequently, rises to "C".

A metering channel 32 is formed through wall portion 16a, at the base thereof, to insure that the housing 12 will not be without a sufficiency of oil, at any time, whether the gears are running, or at halt. As can be seen, the channel 32 is always open to both the reservoir 15 and the housing 12. Thus, the channel 32 will return the level of the sump 28 to level "A" when the gears 18 and 20 come to, and remain at, halt.

As a consequence of my invention, the gear 18 will not be permitted continuously to churn up a great quantity of oil, on steady running, which would only cause the oil to overheat. On running, the gear teeth alone will dip into (and throw) the oil, and this is an adequate—actually an ideal—situation. The oil, gears, and structure 10 remain much cooler than would be possible if the oil level remained at "A" in the sump 28.

The metering channel 32 opens into the reservoir 14 slightly above the bottom surface of the reservoir, to insure that any particulate matter, detritus, and the like, in the oil, will settle out onto the bottom surface. While it is not shown, clearly the bottom surface will have a clean-out plug therein. Too, the channel 32 can have a metering needle adjustably engaged therewith to regulate the metered flow of oil therethrough. Therefore, while I have described my invention in connection with a specific embodiment thereof, it is to be clearly understood that this is done only by way of example, and not as a limitation to the scope of my invention as set forth in the objects thereof and in the appended claims.

I claim:

1. An oil control system, comprising:
   a housing;
   a pair of gears confined, and rotatable on parallel axes, within said housing;
   an oil reservoir; and
   separate, first and second means for effecting fluid communication between said housing and said reservoir; wherein
   said housing and reservoir share a common top and a common base, and have a common wall interposed therebetween;
   one of said gears is in adjacency to said base, and comprises means for impelling oil from said housing to said reservoir via one of said first and second means;
   said wall has an opening therein which defines one of said first and second means;
   said wall has two, straight separate portions;
   one of said portions rises, perpendicularly, from said base, and the other of said two portions depends, perpendicularly, from said top;
   said portions subsist in separate, parallel planes and define, therebetween, an open, vertical space which provides an unobstructed pathway for impelled oil to loft, freely, into said reservoir;
   said one and other portions have linear, terminal edges, spaced-apart from each other, which, therebetween define said opening as a rectilinear void;
   said other gear of said pair thereof is in adjacency to said top, and said axis thereof is at a prescribed distance from said top;
   said terminal edge of said other portion is at a given distance from said top which is less than said prescribed distance, whereby impelled oil can freely loft into adjacency to said top and lubricate uppermost portions of said other gear.

2. An oil control system, according to claim 11, wherein:
   the other of said first and second means comprises a metering channel in penetration of said one portion of said wall.

3. An oil control system, according to claim 1, wherein:
   said housing comprises an oil sump having a given, static oil level, and another, dynamic oil level; and
   said oil impelling means comprises one gear for transforming said static oil level to said dynamic oil level.

* * * * *